Jan. 5, 1971     OLE-BENDT RASMUSSEN     3,553,069
SYNTHETIC POLYMER SHEET
Filed Oct. 3, 1967     4 Sheets-Sheet 1
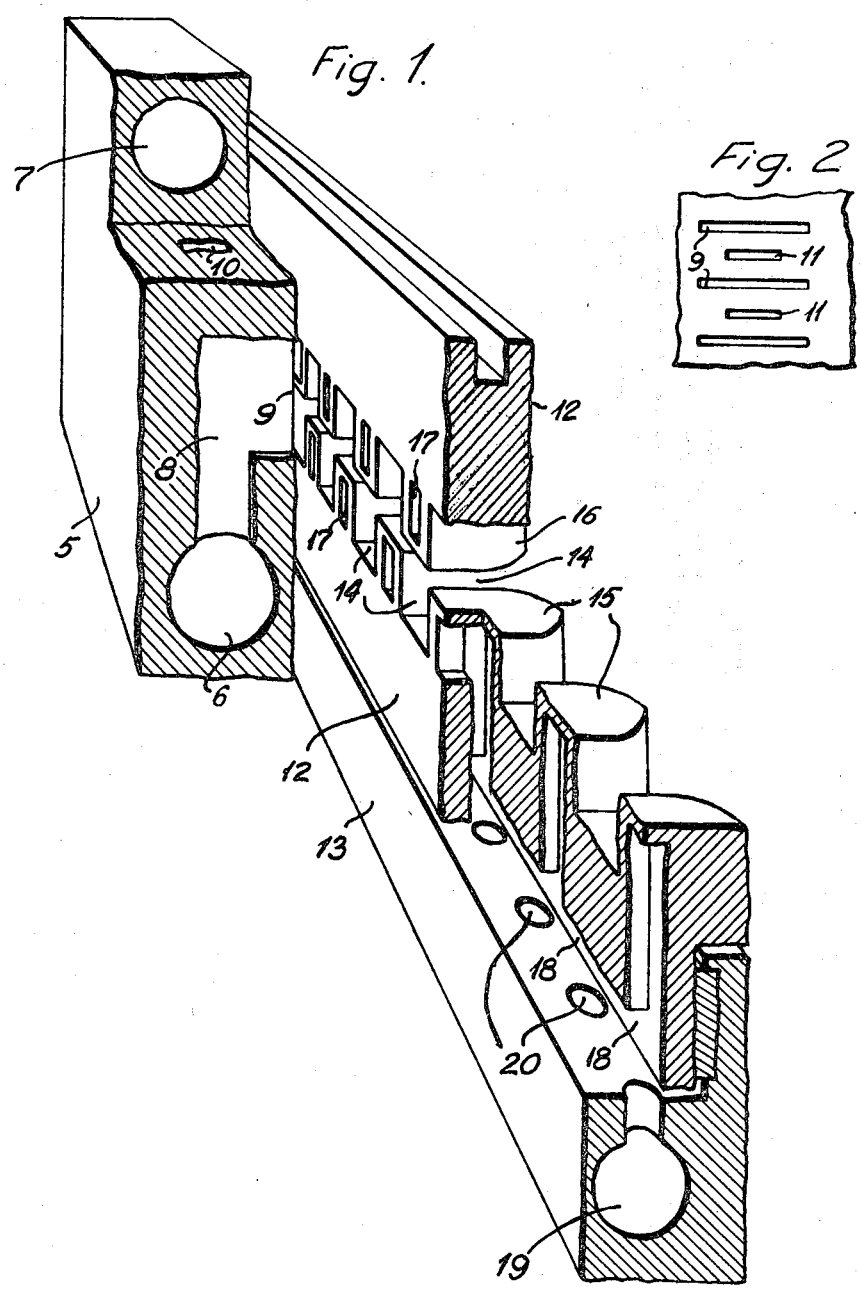
INVENTOR
OLE-BENDT RASMUSSEN

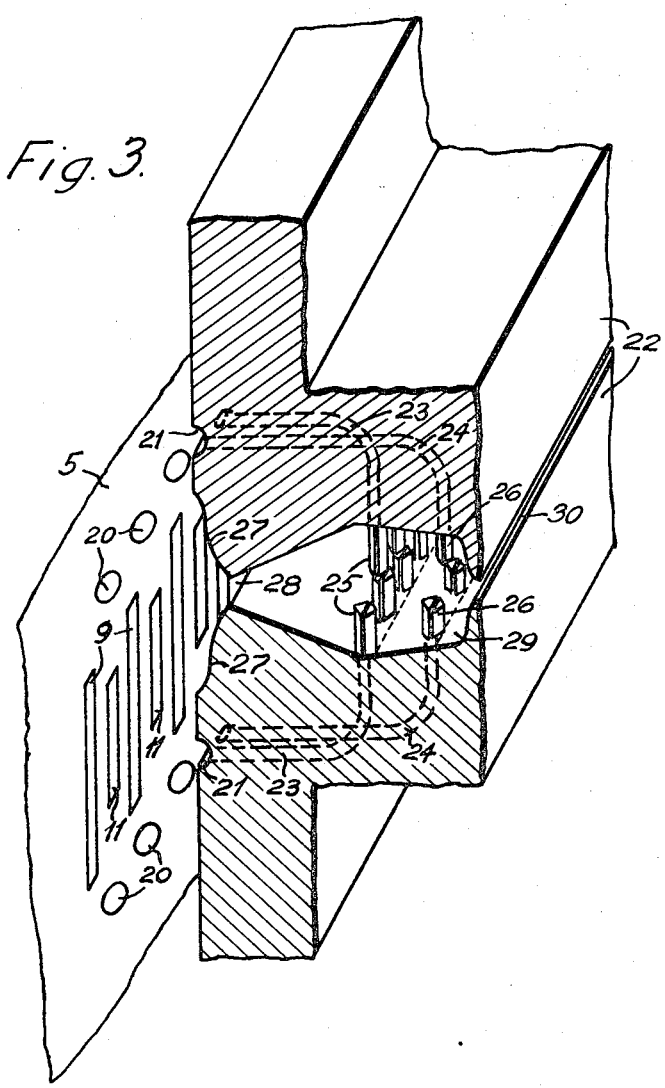

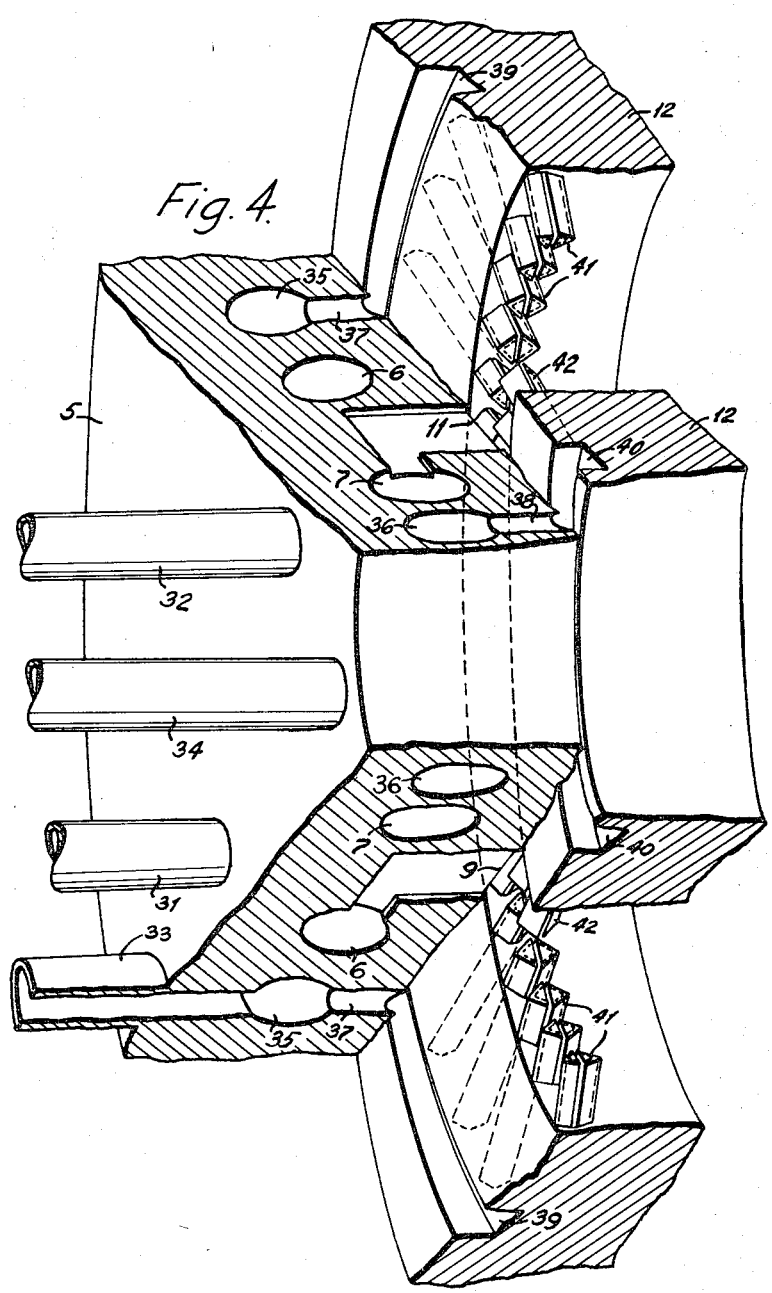

3,553,069
SYNTHETIC POLYMER SHEET
Ole-Bendt Rasmussen, 24 Rugmarken,
Farum, Denmark
Filed Oct. 3, 1967, Ser. No. 672,562
Claims priority, application Great Britain, Oct. 5, 1966,
44,525/66
Int. Cl. B29c 27/02; B32b 3/02, 5/18
U.S. Cl. 16—143                                                                                            7 Claims

ABSTRACT OF THE DISCLOSURE

A synthetic sheet including at least two polymer materials forming separate phases interspersed with each other in the sheet, at least one of said phases being in the form of lamellae traversing a substantial part of the thickness of said sheet and being interconnected by filaments embedded in incisions formed in the edges thereof.

---

Figure 5:
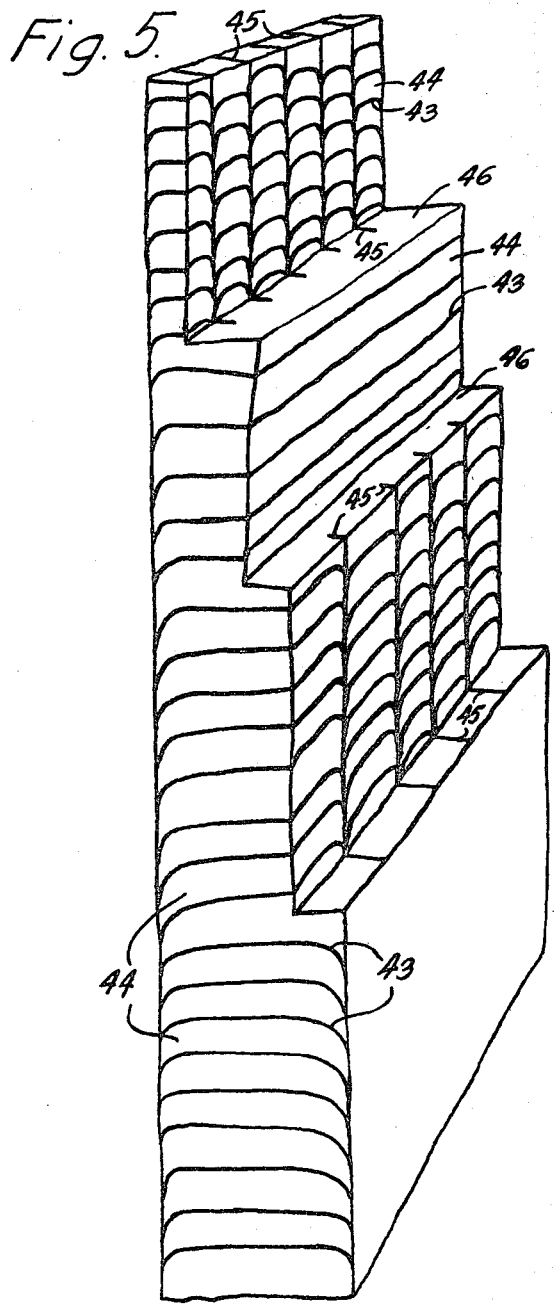

This invention relates to a sheet-like extrusion product consisting of synthetic polymer material, to processes of producing the material, and to apparatus for use in the production thereof.

The said material is primarily intended to be used in the field of textiles, or as carpeting, for tarpaulins or for bags, even if it may also find other use, for example for packaging.

A sheet-like extrusion product according to the invention is consisting of lamellae of a first polymer component which lamellae are substantially parallel to one another and arranged so as to lie transverse to the sheet plane whereas there are incissions transversely to the edges of the lamellae from one or both surfaces of the sheet, said incisions housing filaments of a second polymer component, the two components forming a netlike or honeycomb-like structure in the sheet material.

In the complete specification of my copending U.S. application Ser. No. 391,997 filled Aug. 25, 1964, I have described a method of producing a sheet-like material in which two thermoplastic polymers in fluid state, each of which is subdivided into a multitude of parallel thin streams, are joined with one another in an extruding device in such manner that each individual stream of one polymer is sandwiched between individual streams of the other polymer in a sheet-like structure from the said device, and are being forced through and subjected to the shearing action of a gridlike device moving in lateral direction to the movement of the sheet-like structure to draw out the material of the said individual streams laterally prior to solidification of the sheet.

In the complete specification of my co-pending U.S. application Ser. No. 555,835 filed June 7, 1966, I have further described a process for the production of a sheet-like material, comprising feeding a fluid or semi-fluid synthetic polymer material simultaneously through a number of polymer ducts arranged in a row, while feeding a second component through component ducts alternating with the polymer ducts, subjecting the thus produced streams to a strong lateral shear or dislocation and drawing by means of a comb-like device performing a movement along the series of ducts, resulting in a sheet being formed, comprising parallel lamellae of the polymer material, each of which are combed and drawn to tentacles at one or both of its edges. These lamellae are separated from one another by the second component. The tentacles serve for bonding the lamellae together.

In the latter process, the said component may also be a synthetic polymeric material, and this second polymer may be wholly or partially removed from the sheet-like material, or it may be cracked, fiberized, or expanded to a cellular product in the final product, or the two components may be split apart at their interphases.

In any case, the relative movement established between the part provided with the ducts for supplying the polymeric material and the comb may be either reciprocative or a circular one (if the ducts are arranged circularly). If reciprocative, the individual streams issuing therefrom will be arranged in zig-zag fashion in bands, the width of which defines the thickness of the extruded sheet-like material. If circular, the extruded streams will be arranged in a helical structure.

The present product represents a further development of the product resulting from these prior processes in that the filaments of the second component link the lamellae of the first component more strongly together than do the tentacles.

The lamellae of the first component and the filaments of the second component should preferably form an adhesive bond with each other, and for this reason the said two components are preferably identical or related polymer substances capable of welding together.

The incisions in the lamellae of the first component give said lamellae a featherlike shape having a flat stem and tongues. Depending on the construction of the extrusion apparatus and the extrusion conditions the cross-section of the stem can either have curved cross-section (normally U-shaped, neighbouring stems fitting into each other) or the cross-section can be practically straight. In the latter case, the stems can be either perpendicular to the flat dimension of the sheet or form a smaller angle (different from zero) to the latter, hereby overlapping each other. Furthermore the stems can either be endless or discontinuous. Viewed in a section parallel to the flat dimension of the sheet-like material they are substantially parallel, but may form a zig-zagging pattern.

The tongues can be relatively short or relatively long in proportion to the width of the stem and have a variety of shapes from flat to curved or even cup-shaped, the cups in the latter case fitting into each other. At the interphases between said tongues and the filaments formed from the second component the tongues will normally have tentacles (which may be very small ones) all substantially parallel to the axis of the neighbouring filament area.

In an embodiment of the present product, the filaments of the second component are in lamellar form, the lamellae standing on edge with respect to the sheet plane. A product of this kind is suited, for example, for carpeting, mats and rugs.

In another embodiment of the product according to the invention, the filaments of the second component are consisting of splitfibres. This makes the product suited for finer textiles. When the lamellae of the first component are produced in sufficient fineness, a splitting treatment will result in an unwoven textile of excellent properties.

The sheet-like extrusion product according to the invention also comprises an embodiment, in which the interstices in the netlike structure are filled with a third component consisting of (or in the form of) an expanded polymer. This product may find use, for example, for construction of containers or building elements.

A process of producing a sheet-like material comprises supplying a first component, consisting of a synthetic polymer material in fluid or semi-fluid state to a series of ducts arranged side by side in a row in an extruding device, alternating with similar ducts for another component supplied to the device, hereinafter called the third component, passing the resulting fluid or semi-fluid sheet-like structure through a comb-like device moving laterally before the openings of the said ducts, and supplying a second component through ducts in the teeth of the comb-like device, at least the second component also being a synthetic polymer material, and solidifying the resulting sheet-like structure. Since the second component, which is introduced in the sheet-like material, according to the present method is extruded from the teeth of the comb-like device, and since the said teeth subject the extruded streams of the first and third components to a lateral shear, the second component will form substantially rectilinear or slightly waved bands or strings running substantially perpendicular to the main longitudinal direction of the extruded bands of the first and third components, forming together with said bands a kind of net or honey-comb structure in the extruded and solidified product.

Each of the ducts for the first and third components is preferably slot-formed, the slots transversing the flat dimension of the extruded composite structure, and the slots being spaced as closely to each other as practically possible. Furthermore all ducts, including those formed by the teeth of the comb-like device, preferably narrow at their openings in order to create a high drop of pressure, thus allowing for relatively big differences between the viscosities of the components used.

The third component may be a material which can be expanded to form a cellular product filling the spaces in the honey-comb structure formed by the first and second components. The expanded sheet-like material can then immediately be used as a stiff board for construction of containers, building elements etcetera, provided the components are so selected that there is established an adhesive bond between on one side the expandable third component and on the other side either the first or the second component, an adhesive bond being further established between the first and the second components. For obtaining said bonding effects it can be advantageous to introduce an adhesive component from a fourth system of ducts, placed between the ducts for the first and the third components. Said adhesive component can for instance be a block or graft polymer between the polymers present in the first and third components or in the first and second components.

However, the expanded polymer can also be dissolved, leaving a very voluminous, relatively flexible material which is suitable, for instance, as carpet material.

Although the best quality for textile purposes has been obtained when the third component has been removed at least partly, it can be advantageous, in order to reduce costs, to produce the opening of the solid sheet-structure by mechanical action alone, thus making cracks in the third component or splitting the first and third components apart at their interphases.

In all examples of application described above, the first and second components impart tensile strength, whereas the third component acts as a filler or a separating component (a protective agent). It is to be understood that the invention can be carried out with extrusion of more components for strength purposes and/or more components for filling or separating purposes, as it is possible to set up the described kind of extrusion system with use of many series of ducts and a wide choice of the sequence in feeding the different components.

If the third component should only temporarily fill up the intervening spaces between bands of the first and second components, no expansion being aimed at, the range of materials, which could be used, is almost unlimited, but preferred materials for the first and second components are poly-α-alkylenes, nylon type synthetics, and polyethylene terephthalate, polyvinyl chloride, polyvinyl acetate, and for the third component a different polymer which preferably should be cheap and easily removable and recoverable, such as polyethylene or polyoxyethylene. The third component can even be a paste with no or only little contents of polymer substance. Preferably a comb-like device is used, having the form of a double comb with the teeth pointing against each other. The lamellae hereby get the most regular shape. Whether or not the comb-like device is divided into double combs, two or more of the said devices may be used in succession with the teeth being staggered in the extrusion direction. In this way either coarser teeth may be used, or the introduced streams of the second component may be multiplied.

No matter whether the comb is single or multiple, it is generally preferable to let the orifices of the ducts in each of the teeth be slot-formed so as to cover the main part of each tongue of a lamella with the second component. However, it will often be advantageous to apply more of the second component at the bottom of the incisions than near the surface of the material as this makes a more effective incorporation, thus improving the bonding.

Furthermore, it is generally preferable to make the orifices at the front of the teeth or near the latter rather than at their rear, i.e. to extrude the second component in counter-current or nearly so, as the second component will hereby act as a kind of lubricant for the cutting of incisions in the first component, especially if the second component has lower melt viscosity than the first component. This will provide a clearer cut and thus a better adhesion.

In another embodiment of the present method, the sheet-like semi-fluid to fluid structure is passed through a necking-down chamber prior to passing through the comb-like device through which the second component is supplied, said necking-down chamber and the teeth bing fixed to each other. The term "necking-down chamber" indicates a chamber which very suddenly reduces its thickness to a fraction of its original. The transversal dragging of the lamellae will hereby be effected by the walls of said chamber instead of the teeth, the latter now performing their cutting action while the flow is straight forward through the combing device. This improves the regularity of the tongues.

In succession to the hollow teeth extruding the second component there may be placed one or several rows of teeth not carrying any component, but arranged to cut through the tongues in order to make the structure more open and flexible.

According to the invention the sheet-like structure is expediently subjected to a necking-down after having passed the comb-like device. Thus it is possible to reduce the thickness of the sheet to a desired size before the solidification.

An apparatus for carrying out the present method comprises, in an extruding device, two parts of which one is movable relative to the other, one part being provided with a series of elongated slots placed side by side in a row, said part being further provided with a duct for each of the first and third components, the duct for the first component being interconnected with every second of the elongated slots, and the duct for the third component being interconnected with the other slots, the second part of the extruding device being in the shape of a comb-like structure, the teeth of which are hollow and provided with slots for supplying the second component of the sheet-like product, the cavities of said hollow teeth or rods being in connection with a duct for the said second component.

In order to multiply the streams of the second component a double or multiple comb-like device may be used, the teeth of which are in mutually staggered position.

In one embodiment of such apparatus, the comb-like structure consists of two combs connected with the teeth pointing against each other, the teeth of one comb lying in extension of those of the other with a short intervening space, each comb having a duct for supplying the second component to the teeth. The intervening space between the teeth causes a kind of back-bone to be formed in the sheet-like material.

In a further embodiment of the said apparatus, a necking-down chamber is interposed between the first and second of the two parts in the extruding device. This results in the band-like streams of the first and third components getting a curved cross-section, the edges folding back relative to the middle, owing to the drag exerted on the edges in contact with the walls of the necking-down chamber.

In order to limit or reduce the thickness of the extruded sheet-like structure, a necking-down chamber may further be provided for receiving the material passing through the comb-like structure, said necking-down chamber having a slotted exit parallel to and of a length substantially corresponding to the row of slots for supplying the first and third components.

In carrying out the present invention it can be advantageous to extrude the first and second components in form of pre-polymers subsequently carrying out an after-polymerization process.

For a better understanding of the invention, reference will be made in the following to the drawings, in which:

FIG. 1 is a schematical perspective view of the extruder part of an apparatus for use in the production of the present sheet-like material, with some parts cut away, FIG. 2 is a cross-sectional view of some of the slots for extruding the first and third components of the said sheet-like material, FIG. 3 is a schematical perspective view of parts of another embodiment of the apparatus of the invention, FIG. 4 is a schematical view of parts of an embodiment of the apparatus of the invention, which is designed for extruding the sheet-like material in tubular form, FIG. 5 is a schematical perspective view of the structure of the sheet-like product of the invention.

In FIGS. 1 and 2 of the drawings, a steady part 5 of the extruding device is provided with main ducts 6 and 7 for the first and third components respectively.

The main duct 6 is connected by smaller ducts 8 to a number of slots 9, and the main duct 7 is connected by smaller ducts 10 to a number of slots 11, the slots 9 alternating with the slots 11 as shown in FIG. 2.

At a small distance from the orifices of the slots 9 and 11, a comb-like structure 12 is movable back and forth along the row of slots between guideways 13, only one of which is shown.

The structure 12 forms a kind of frame around a longitudinal slot 14, the length of which at least equals the length of the row of slots 9 and 11, the width equalling the length of the slots 9.

From both sides hollow teeth 15 and 16 project into the slot 14, leaving a narrow intervening space. The cavities of these hollow teeth have orifices 17 facing the orifices of the slots 9 and 11, and are connected by a channel 18, to which the second component of the sheet-like material can be fed from a main duct 19 with suitably spaced smaller ducts 20 leading to the channel 18.

The extruding device functions in the following manner: By simultaneous steady feeding of the first and third components to the main ducts 6 and 7 respectively, streams of these components in band-like form are pressed out from the slots 9 and 11, respectively. By a reciprocating movement of the structure 12, the teeth 15 and 16 will exert a strong drawing and dislocating effect upon the component streams issuing from the slots 9 and 11, folding said streams back and forth, and compressing them to a sheet-like structure. If the teeth are moving very close to the orifices of the slots, a shearing action may result in cutting the streams into segments, but generally it is preferable that the teeth are spaced so much apart from the orifices that no cutting into segments takes place, but the streams are piled up in zig-zag fashion in the sheet.

On introducing the second component in the sheet structure from the orifices 17 in the hollow teeth, substantially rectilinear, or slightly waved bands of this third component will be formed, running substantially parallel to the main longitudinal direction of the extruded structure, and thus substantially perpendicular to the slings formed by the first and third components, since the extruded sheet will follow the comb-like structure in its movement, so that the second component stream from a particular tooth will always be incorporated at substantially the same distance from the borders of the extruded sheet-like structure.

Generally, the sheet-like structure leaving the comb device will enter a so-called necking-down chamber, for example a chamber of substantially U-shaped or V-shaped cross-section with a narrow slot in the bottom of the V or U to substantially reduce the thickness of the extruded sheet. Having left the extruder device, the composite sheet-like material can be further drawn down by drawing in melted or semi-melted state. Furthermore the material may be molecularly oriented by longitudinal and/or lateral stretching below the melting point.

In the apparatus illustrated by FIG. 3 the ducts for the second component are also provided in the steady part 5 of the extruding device. From these ducts, the connecting ducts 20 lead the second component to channels 21 in a double-comb reciprocating structure 22, individual ducts 23 and 24 connecting the channels 21 with hollow teeth 25 and 26. As shown, each part of the structure 22 carries two rows of the hollow teeth 25 and 26 in mutually staggered position.

On leaving the slots 9 and 11, the individual streams of the first and third components unite to a fluid sheet-like structure, which enters a necking-down chamber 27, reducing the thickness of the fluid sheet-like structure.

The necking-down chamber 27 is terminated by a slot 28 widening again towards the double comb structure formed by the teet 25 and 26. Behind the latter in the flow direction a further necking-down chamber 29 is provided, which is terminated by a slot 30.

FIG. 4 illustrates an embodiment of an apparatus according to the invention, which is designed for extruding a sheet-like product in tubular form.

The extrusion head of the apparatus consists of a steady or fixed part 5 and a double comb structure 12, both annular in form, and the two parts of the comb structure 12 being rotatable, if desired with slightly different speeds of rotation.

The first component of the sheet-like structure to be extruded is supplied through a tube 31 to the main duct 6, and the third component is supplied through a tube 32 to the main duct 7, both ducts 6 and 7 being in the fixed part 5.

The second component is supplied through tubes 33 and 34 to ducts 35 and 36, respectively, also provided in the fixed part 5.

A number of suitably spaced smaller ducts 37 and 38 connect the ducts 35 and 36 with grooves or channels 39 and 40 in the rotatable parts forming the double comb structure 12 from which grooves or channels 39 and 40, the second component is distributed to series of hollow teeth 41 and 42.

It will be noted that each tooth 41 or 42 opens towards the interspaces between the teeth, but it would also be possible to extrude the second component in the wake of, or in counter-current to the flow of the first and third components.

When the second component is desired to be fibre-forming, this can be accomplished in various ways.

One way is to supply a split fibre-forming dispersion of one polymer in another polymer to the ducts 35 and 36.

Another—and better—way is to alternately supply two different components to the channels 39 and 40, one of which is able to weld together with the first component of the present material, the other being a separating substance. The two components can be supplied alternately through each of the tubes 33 and 34, but one of them could also be identical with the material used for either the first or the third component of the present sheet-like material. The other could be the other one of the first and third components, or it could be different, being supplied from the ducts 35 and 36.

When one or both of the first and third components form part of the second component, they can be supplied to the channels 39 and 40 by means of ducts branched off from the ducts to the slots 9 or 11 or both series of slots.

The embodiment of FIG. 4 could also be designed so as to make part 5 rotatable, and the comb structure fixed. Then the ducts 6 and 7 would have to be fed from a fixed part, for example to channels in the part 5, similarly to channels 39 and 40 of FIG. 4. Using a rotating comb structure 12 results in the extruded tubular sheet-like material rotating around the tube axis, which would mean that a set of draw off rollers for the solidified tube would also have to rotate with the tube. This is avoided by making part 5 rotatable.

FIG. 5 schematically illustrates an embodiment of the sheet-like material of the invention in a so-called "peeled" view. The first component 43 forms lamellae, which alternate with lamellae of the third component 44, which is an expanded cellular polymer substance. The latter in this case being extruded from the shorter slots (11 in FIG. 2) are fully enveloped by the former, so that the first component forms a kind of skin on the surfaces of the sheet-like product. The second component forms band-like insertions 45 running substantially perpendicularly to the lamellae 43 and 44 of the first and third components, respectively. It will be noted that the lamellae 45 are intersecting the lamellae 43 and 44 only to a certain depth from each side, leaving a kind of spine 46 in the lamellae 43 and 44.

To understand why the lamellae 45 intersect the lamellae 43 and 44 it must be remembered that the sheet-like material is extruded in a semi-fluid to fluid form. Thus, even if the first and third components are extruded perpendicularly to the fixed part of the extruding devices, the reciprocating or revolving parts will exert a shear-like influence, by which the extruded bands will be forced to bend over to one side and lie practically perpendicularly to the extrusion direction.

The second component, on the other hand, is not or only very slightly influenced by the movement of the reciprocating or rotating part of the extruding device, since it is extruded from said part, and will thus form streams or bands following the extrusion direction.

The sheet-like material of the present invention is further illustrated by the following examples, in which the melt indices are determined according to ASTM Designation: D1238–62T.

EXAMPLE 1

The apparatus of FIG. 4, but with a comb-like structure as that of FIG. 3 in annular form, is used. The third component, which is fed to the slots 11, is polyethylene of melt index 7 (Cond. E), and the first component, fed to slots 9, is Nylon 6 of melt index 2.2 (Cond. K).

The second component is a splitfibre-forming dispersion of 35 parts by weight of the above polyethylene of melt index 7 in 65 parts by weight of Nylon 6 of melt index 0.3, said dispersion being prepared in, and supplied from a planetary type extruder.

The extrusion temperature is 270–280° C.

The comb-like structure is rotated at a peripheral speed of about 1 meter per second, and the thickness of the extruded tubular sheet is reduced to about 0.2 mm. by stretching while the material is still fluid. Then, transversal stretching in the ratio 2:1 is performed at 160° C., when the nylon has crystallized while the polyethylene is still melted.

After solidification, polyethylene is washed out by passing the material through hot xylene at 130° C. during about 20 seconds. The resulting product is suited as a textile, having the character of woven material of being able to yield in a diagonal direction.

EXAMPLE 2

An embodiment of the apparatus of FIG. 4 as in Example 1 is used, but with the further modification that a fixed part 5 without the ducts 35 and 36 is used. Instead, slots 9 are extended so as to supply some of the third component to the channels 39 and 40, and ducts branched off from those supplying slots 11 lead some of the first component also to channels 39 and 40.

Using the first and third components of Example 1, the second component will be built up by layers of the first and third components being deposited alternately in the channels 39 and 40.

The procedure is as described in Example 1, and the resulting product is of similar appearance, but has a better tensile strength and better splitability for a given content of polyethylene.

EXAMPLE 3

A modification of the apparatus of Example 1 is used in which the slots 9 are extended so as to communicate with channels 39 and 40.

The third component is as in Example 1, and Nylon 6 of melt index 0.3 is used as the first component.

The second component is built up from Nylon 6 of melt index 2.2, layers of which are deposited (from ducts 35 and 36) in channels 39 and 40, alternating with the layers deposited from the extensions of the slots 9 to form the second component of the sheet-like material.

The further procedure is as in Example 1, but the resulting product is of greater flexibility, due to the use of the more viscous Nylon 6.

EXAMPLE 4

In this example a further modification of the apparatus of Example 1 is used in which ducts, communicating with channels 39 and 40, are branched off from the ducts supplying the first component to the slots 9.

The first component is an in Example 1, and the material of the second component of Example 1 is supplied to ducts 35 and 36 to be deposited in channels 39 and 40 in alternating layers with the layers of the first component supplied from the branched off ducts to form the second component.

The third component consists of the polyethylene of Example 1, in which, however, an expanding agent has been incorporated.

The extruded tubular sheet is stretched and washed as in Example 1, and the resulting product has wear-resistant surfaces and a highly porous interior.

EXAMPLE 5

The apparatus of FIG. 4, is used, a necking-down chamber with cooling means being mounted after the comb-like structure 12.

The first component supplied to slots 9 is a block copolymer consisting of about 60 parts by weight of high density polyethylene and about 40 parts by weight of polystyrene of melt index 2.

The third component supplied to slots 11 is polystyrene, containing petrol ether as an expanding agent.

The second component is a block copolymer similar to that of the first component, but with melt index 10, i.e. less viscous than the first component.

The extrusion temperature is adjusted so that the sheet material leaving the necking-down chamber has a temperature of about 150° C.

The necking-down chamber builds up a pressure to prevent too much expension before the extruded sheet leaves the apparatus.

The resulting product is a rigid sheet material, which is suited for use as a building material and for packing boxes.

I claim:

1. A synthetic sheet material comprising at least two polymer materials forming separate phases in the sheet, at least one of said phases being in the form of lamellae interspersed with at least one other phase, each of said lamellae traversing a substantial part of the thickness of the sheet material, characterized in that the lamellae are interconnected adjacent at least one of the surfaces of the sheet by spaced substantially parallel filaments of a third filament forming polymer material which filaments are embedded in incisions in the edges of the lamellae.

2. A sheet material as in claim 1 characterized in that the filaments are welded to the lamellae.

3. A sheet material as in claim 1 characterized in that the filaments are flat and are disposed with their flat dimension traversing in sheet plane.

4. A sheet material as in claim 1 characterized in that the filaments consist of split fibres.

5. A sheet material as in claim 1 characterized in that the polymer material interspersing the lamellae forms partially disrupted connections between said lamellae.

6. A sheet material as in claim 1 characterized in that the polymer material interspersing the lamellae consists of fiberized polymer.

7. A sheet material as in claim 1 characterized in that the polymer material interspersing the lamellae consists of an expanded polymer.

References Cited

UNITED STATES PATENTS

| 2,752,276 | 6/1956 | Woock | 161—109 |
| 2,806,809 | 9/1957 | Schuh | 161—38 |
| 3,107,195 | 10/1963 | Stegler et al. | 161—36 |

FOREIGN PATENTS

| 966,339 | 8/1964 | Great Britain | 161—37 |

ROBERT F. BURNETT, Primary Examiner

W. A. POWELL, Assistant Examiner

U.S. Cl. X.R.

18—12; 156—244, 500; 161—170; 264—176

UNITED STATES PATENT OFFICE
CERTIFICATE OF CORRECTION

Patent No. 3,553,069            Dated   January 5, 1971

Inventor(s)   Ole-Bendt RASMUSSEN

It is certified that error appears in the above-identified patent and that said Letters Patent are hereby corrected as shown below:

Column 7, line 60, change "slots 11" to -- slots 9 --.

line 62, change "slots 9" to -- slots 11 --.

Column 8, line 42, change "slots 9" to -- slots 11 --.

Signed and sealed this 2nd day of November 1971.

(SEAL)
Attest:

EDWARD M.FLETCHER,JR.              ROBERT GOTTSCHALK
Attesting Officer                  Acting Commissioner of Patents